United States Patent Office 3,283,817
Patented Nov. 8, 1966

3,283,817
METHOD AND COMPOSITION FOR TREATING FORMATIONS PENETRATED BY WELLS
William G. Roberts, Bartlesville, Okla., assignor to Phillips Petroleum Company, a corporation of Delaware
No Drawing. Filed Jan. 3, 1964, Ser. No. 335,681
20 Claims. (Cl. 166—42)

This invention relates to treating of formations penetrated by wells. In one aspect this invention relates to fracturing of a formation penetrated by a well bore. In another aspect this invention relates to a method of fracturing a fluid producing subterranean formation penetrated by a well bore. In another aspect this invention relates to a fracturing liquid composition for hydraulically fracturing formations of relatively low permeability penetrated by a well bore.

In recent years, various methods have been proposed in the oil industry for increasing or stimulating the productivity of oil or gas wells by enlarging the flow or drainage pattern within a selected oil- or gas-producing formation of relatively low permeability. Emphasis has been placed on hydraulically fracturing such formations with various liquids, such as native crude oil, lease crude oil, diesel fuel, kerosene, etc., with or without propping agents, such as sand, suspended therein. These liquids are pumped in a well adjacent the formation to be fractured and sufficient pressure applied to the body of liquid in the well. The hydraulic pressure applied to such low permeable formations creates tensile stresses in the rock of the formation surrounding the well bore and these stresses cause splitting, parting, or fracturing of the rock, the pressure required to part or fracture a formation in a well being termed "formation breakdown pressure." The initially formed fractures or channels are then extended by the injection of hydraulic liquid therein, the propping agent being deposited in the fractures to maintain the permeability of the formation during subsequent production thereof.

A continuing and serious problem in the production of oil and/or gas from formations penetrated by well bores in the earth is the formation of deposits of low solubility or insoluble salts in the interstices, pores, passageways, and fissures (including fissures and/or fractures newly formed by the fracturing pressures) of the producing formation. Deposition of said low solubility or insoluble salts in the above-described passages of the producing formation has a pronounced detrimental effect upon production from said formation. Said deposits have interfered in both primary and in secondary production. In many instances the permeability of the formation is so impaired as to require repeated expensive treating operations, or in some instances even abandonment of the well.

Said deposits of low solubility or insoluble salts are commonly precipitated or otherwise formed from underground waters, an appreciable flowage of which is frequently associated with the production of oil and/or gas. Said underground waters almost invariably contain varying amounts of dissolved substances. During production of the well said dissolved substances flow or progress toward the well bore and often undergo chemical and/or physical changes during said flow. Said changes disturb the equilibrium of said dissolved substances which frequently results in said substances being precipitated out or otherwise deposited in the pores and other passages of the producing formation. An example of a chemical change which can contribute to these undesirable conditions is the intermixing of different brines which come together within the formations, such as the intermixing of a brine having a high calcium ion content and a brine having a high sulfate or carbonate ion content. Another chemical change which can occur is the loss of carbon dioxide and resultant reduction of carbonic acid content, thereby lessening the solubility in the underground water of such compounds as calcium sulfate. Still another chemical change which can occur is the conversion of soluble bisulfates to insoluble sulfates and the conversion of soluble bicarbonates to insoluble carbonates. Examples of physical changes which can effect the precipitation or deposition of said low solubility or insoluble salts are reduction in temperature and/or pressure as the fluid progresses through the formation toward the well bore.

Examples of the more detrimental low solubility or insoluble salts which are formed by such chemical and/or physical changes in the underground waters are the sulfates and carbonates of calcium, barium, and strontium, and the carbonate of magnesium. Calcium sulfate is particularly objectionable. For practical purposes the above-named salts may be considered insoluble in water. It will be noted that the metals in the above-named salts are alkaline earth metals. Thus, the present invention finds its greatest application in preventing the deposition of the low solubility or insoluble salts of the alkaline earth metals. As defined herein and in the claims, unless otherwise specified, the term "alkaline earth metals" includes calcium, barium, strontium, and magnesium.

As indicated above, deposits of said low solubility or insoluble salts interfere with both primary and secondary production. In secondary production or recovery operations, such as a water flooding operation wherein water is employed as the driving fluid, continued successful operation frequently is not obtained because of deposits of said low solubility or insoluble salts. Even wells which have been successfully fractured by the injection of suitable fracturing fluids, with or without propping and/or gelling agents, and which have showed improved production when first put back into operation, have declined within a relatively short time to very low productivity even though there is evidence of extensive oil reserves remaining in the formation. Investigations have shown that mineral deposits of the type described above have clogged both the natural passageways in the formation and those produced in the fracturing of the formation. Such clogging of said passageways will restrict the flow through the formation to approximately that existing before the fracturing, or in many instances to a flow even lower than that preceding the fracturing, and it sometimes decreases the flow to the extent that the well must be abandoned unless retreated in some manner.

In the prior art, carbonate deposits have largely been removed by repeated acidizing treatments, such as with inhibited aqueous solutions of hydrogen chloride. Sulfate deposits, however, being only slightly soluble in such acidizing solutions present more difficult problems which have only been overcome to a limited extent, if at all, by such means as shooting the well with nitroglycerine or refracturing the formation. Such methods of solving the problems presented by the deposition of low solubility or insoluble salts not only entail the expenditure of considerable time and money, but are also temporary in nature because they do nothing to alleviate the trouble at its source. The flow of the underground aqueous fluids after each such treatment will again inevitably cause an accumulation of said deposits with the resultant reduction of production unless the well is again treated.

Attempts have also been made in the prior art to solve the problems created by the above-described deposits by merely dropping treating compounds including various known ion sequestering and water softening agents down the well bore. However, such methods have had little or no effect upon production beyond a few hours or, at most, a few days.

In comparatively recent years a method comprising injecting a suspension of one or more complex salts which are alkali metal alkaline earth metal polyphosphates in a water-base or oil-base liquid, which may also have admixed therewith a propping agent and/or a gelling or thickening agent, into the passages of the formation penetrated by the well bore. Said complex polyphosphate salts can be injected into the passageways of the formation after the fracturing operation has been performed but are more usually mixed with the fracturing fluid at the time the fracturing job is carried out. At least a part of the said complex polyphosphate salts are apparently imbedded or otherwise deposited in said passageways. Thus, in the production of the well said polyphosphates dissolve slowly and in some manner, not definitely known at present, inhibit crystal growth of the low solubility or insoluble salts and keep same suspended in the well fluid. Proponents of said method have stated in the prior art that protection of the well from the formation of said deposits for periods of time in the order of six months is often achieved.

Thus, at best, said complex polyphosphate agents provide only a temporary solution to the problem because said polyphosphate agents are eventually used up. The treatment must then be repeated or else new deposits will form.

From the above description of the problem facing the oil and/or gas producing industry, it is clear that more effective prevention of clogging of pores and passageways in fluid bearing formations penetrated by a well bore and resulting from the deposition of low solubility or insoluble salts is a continuing problem of serious consequences.

The present invention provides a solution to the above-described difficulties by providing a dual or combination propping and alkaline earth metal ion scavenging agent, when once placed in passageways in the formation, can be regenerated in place. Thus, broadly speaking, the present invention resides in the concept of placing said dual or combination propping and alkaline earth metal ion scavenging agent in the formation passageways, fissures, fractures, etc., as during the fracturing of formations penetrated by a well bore, to serve in the dual capacity of (1) a propping agent and (2) an alkaline earth metal ion scavenging agent. It is an outstanding advantage of the invention that said dual agent can be simply and economically regenerated in place. Thus, when employing the present invention in the completion of new wells or in the treatment of old wells, once said dual or combination agent has been placed in said passageways, fissures, fractures, etc. of the formation no further treatment, other than an infrequent simple and inexpensive regeneration is necessary.

An object of this invention is to provide an improved method of fracturing a formation penetrated by a well bore. Another object of this invention is to provide an improved fracturing liquid composition suitable for use in the fracturing of formations penetrated by a well bore. Another object of this invention is to prevent the deposition of low solubility or insoluble salts in the pores, passageways, fissures, and fractures of a formation penetrated by a well bore. Another object of this invention is to provide an improved dual or combination propping and alkaline earth metal ion scavenging agent. Other aspects, objects, and advantages of the invention will be apparent to those skilled in the art in view of this disclosure.

Thus, according to the invention, there is provided a method of fracturing a formation penetrated by a well bore, which method comprises introducing into said well bore under sufficient pressure to fracture said formation a fracturing liquid composition having suspended therein finely divided particles of a combination propping and alkaline earth metal ion scavenging agent.

Futher according to the invention, there is provided a composition of matter, useful in the fracture treatment of a formation penetrated by a well bore, comprising a liquid carrier medium having dispersed therein finely-divided particles of a combination propping and alkaline earth metal ion scavenging agent.

The dual or combination propping-ion scavenging agent of this invention comprises finely-divided, crush-resistant particles having alkaline earth metal ion scavenging groups, such as alkali metal sulfonate groups, available at the surface thereof. As used herein and in the claims, unless otherwise specified, the term "alkali metal" is employed generically to include the metals sodium, potassium, lithium, cesium, and rubidium, and ammonium.

The presently prefered dual or combination agents of the invention are finely-divided, crush-resistant particles comprising polymers of monovinyl-substituted aromatic hydrocarbons which have been sulfonated or otherwise treated to introduce alkaline earth metal ion scavenging groups onto the surface thereof. As used herein and in the claims, unless otherwise specified, the terms "polymer of a monovinyl-substituted hydrocarbon" and "polymers of monovinyl-substituted hydrocarbons" are employed generically to include homoploymers of said monomers and also copolymers of said monomers with a suitable crosslinking agent. Suitable crosslinking agents are the various divinyl-substituted aromatic hydrocarbons. As used herein and in the claims, unless otherwise specified, the term "vinyl" is employed generically to include vinyl and also alpha-methylvinyl groups.

The monovinyl-substituted and divinyl-substituted aromatic hydrocarbon monomers which can be utilized in preparing the dual or combination agents of the invention include those which can be represented by the formulas

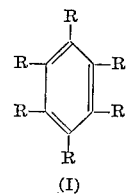
(I)

and

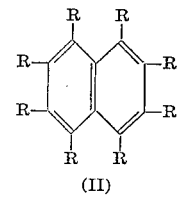
(II)

wherein: each R substituent is selected from the group consisting of a hydrogen atom, and methyl, ethyl, vinyl, and alpha-methylvinyl groups; and wherein at last one and not more than two of said R substituents are vinyl or alpha-methylvinyl; and mixtures thereof.

Examples of said monomers represented by the above Formulas I and II include, among others, the following: styrene; alpha-methylstyrene; 4-methylstyrene; 3-ethylstyrene; 2,3-dimethyl-alpha-methylstyrene; 2,3,4,5,6-pentamethylstyrene; 1,4-divinylbenzene; 1,3-di(alpha-methylvinyl)benzene; 1,2-divinylbenzene; 3 - ethyl-1,4-divinylbenzene; 2,3,5,6-tetraethyl-1,4-divinylbenzene; 2 - vinylnaphthalene; 4-ethyl-1-vinylnaphthalene; 3,7-dimethyl-2-vinylnaphthalene; 3-methyl-7,8-diethyl-2-vinylnaphthalene; 1,4-divinylnaphthalene; 2,7-divinylnaphthalene; 2,6-di(alpha-methylvinyl)naphthalene; 1,3,4,5,6,7,8-heptaethyl-2-vinylnaphthalene; and the like.

The above-described polymers of monovinyl-substituted aromatic hydrocarbons can be prepared according to conventional polymerization procedures, including solution, bulk, suspension, or emulsion polymerization. Polymerization initiators that can be used include free radical initiators such as various peroxides including benzoyl peroxide, di-tert-butyl peroxide, dicumyl peroxide, and p-methane hydroperoxide; organometal-type initiators such as those formed from trialkylaluminum and titanium halides such as triethylaluminum plus titanium tetrachloride, triethylaluminum plus vanadium tetrachloride, and triisobutylaluminum plus titanium tetrachloride; and the various redox systems such as (1) a peroxide catalyst such as hydrogen peroxide, potassium persulfate or benzoyl peroxide plus a reducing agent such as ferrous ammonium sulfate or cuprous chloride and (2) iron pyrophosphate plus ferrous sulfate. Such polymerizations are usually carried out at a temperature in the range of 0 to 100° C. for a reaction period of from 1 to 100 hours. Upon completion of the polymerization, the polymers can be recovered by any conventional method such as coagulation, either by cooling or by addition of a precipitating agent, steam stripping and the like. The actual preparation of these polymers is well known to those skilled in the art and does not, per se, constitute a part of the present invention. For example, U.S. Patent 2,366,007 discloses suitable polymers which can be used in the practice of this invention and further details regarding their preparation.

The presently most preferred polymers for use in the preparation of the dual agents of this invention are the copolymers of a monovinyl-substituted aromatic hydrocarbon with a minor amount of a divinyl-substituted aromatic hydrocarbon crosslinking agent. Such copolymers can be prepared by charging both types of monomers to the polymerization zone, or by polymerizing the monovinyl monomer partially to completion and then adding the crosslinking agent.

Regardless of the method employed to prepare the above-described polymers, the above-described monomers are utilized in amounts within the ranges of from 100 to 80 parts by weight of the monovinyl-substituted aromatic hydrocarbon and from 0 to 20 parts by weight of the divinyl-substituted aromatic hydrocarbon, based on total monomers. Thus, when the polymerization is carried essentially to completion, the resulting polymer will contain from 0 to 20, preferably from 2 to 15 percent by weight of the divinyl-substituted aromatic hydrocarbon. When the polymerization is carried essentially to completion, the resulting polymer is essentially insoluble in aqueous and hydrocarbon media.

Particles of said resulting polymer have a crushing or compressive strength within the range of about 10,000 to about 16,000 p.s.i. The amount of divinyl-substituted aromatic hydrocarbon monomer present in said polymer affects the compressive strength of the polymer. Generally speaking, the divinyl-substituted monomer increases said compressive strength. However, polymers containing above about 20 weight percent of the divinyl-substituted hydrocarbon tend to be brittle and suffer a loss in compressive strength for this reason.

Particles of said resulting polymer are somewhat porous. Thus, when sulfonated or otherwise treated to introduce the alkaline earth metal ion scavenging groups onto the surface thereof, the term "surface" includes the surface available within the pores of the particle. Thus, the terms "surface," "on the surface," "onto the surface," "surface available," and "available at the surface" are employed interchangeably herein and in the claims, unless otherwise specified.

Following the formation of the polymers, the polymer product is treated to introduce alkaline earth metal ion scavenging groups on the polymer surface. Before such treatment the polymers should be in the particle size range desired for use in the practice of this invention. By proper selection of the polymerization method and conditions, e.g., pearl or suspension polymerization, properly sized polymer particles can be obtained directly from the polymerization. If larger than desired particles are obtained from the polymerization, comminution methods can be employed to reduce the particle size to the desired range. Whichever method is used, the particle size of the polymers will generally fall within the range from 10–100, preferably 20–80 mesh, U.S. Standard Series. It is preferred to obtain the desired particle sizes directly from the polymerization, as such particles are in the form of beads, generally spherical in shape, and are preferred over the irregular shapes obtained by comminution.

After the desired polymer particle sizes are obtained, the polymer can be sulfonated to introduce sulfonic acid groups on the surface of the particles. Suitable sulfonation agents include, for example, concentrated sulfuric acid, oleum, $SO_3$, chlorosulfonic acid, and the like. Sulfonation is effected by conventional procedures employing an excess of the sulfonating agent at a temperature generally ranging from 0 to 50° C. Following sulfonation, the sulfonic acid groups thus introduced are converted to the alkali metal salt form by neutralization with an alkali metal hydroxide, e.g., NaOH. The resulting material, comprising an alkali metal salt of a sulfonated polymer of a monovinyl-substituted aromatic hydrocarbon, is in a suitable form for serving as a dual propping and scavenging agent in accordance with this invention. For convenience, said sulfonic acid groups converted to the alkali metal salt form are sometimes referred to herein as "alkali metal sulfonate groups."

The two characteristics of the dual agent of this invention which enable it to serve both as a propping agent and as an ion-scavenging agent are its resistance to crushing under pressure and the presence of ion-scavenging groups, e.g., alkali metal sulfonate groups. Within the broad aspect of the invention, one can also apply a coating of the polymer of a monovinyl-substituted aromatic hydrocarbon to the surface of crush-resistant carrier particles and thereafter sulfonate or otherwise treat the thus-coated particles to introduce the alkaline earth metal ion-scavenging groups. For example, sand, glass beads (preferably porous glass), crushed walnut hulls, alundum, coke, and other conventional propping agents can be coated with such polymers, followed by sulfonation as described above. Such coatings can be applied, for example, by addition of crush-resistant carrier particles to the polymerization zone, or by addition of the carrier particles to a melt of the polymer followed by comminution of the mixture after solidification. Other methods will be apparent to those skilled in the art in view of this disclosure.

The most preferred polymer type within the group described above is a sulfonated 95/5 to 85/15 styrene/divinylbenzene copolymer which has been neutralized with sodium hydroxide to convert the sulfonic acid groups on the polymer surface to the sodium salt form. This material can be used per se or can be used in the form of a coating on carrier particles as described before. Commercial forms of said preferred agents can be purchased as "Amberlite" IR–120, "Dowex" 50, and "Permutit" Q. These materials are available commercially in generally spherical-shaped beads having particle sizes within the above-described ranges.

The liquids which are used as a carrier or vehicle for the dual agents of this invention include lease crudes, gas oil, diesel fuel, kerosene, gasoline, bunker C fuel oil, naphtha, refined oils, residual oils, refinery cuts or blends, and the like. Generally, the hydrocarbon oils will have a gravity of from about 10 to about 45 API gravity, and will have a viscosity of from 10 to 500 centipoises at 80° F. Other fluids such as water and emulsions of oil and water can be employed, but hydrocarbon fluids are preferred.

The fracturing fluid of this invention will comprise one of the above fluids in which there is slurried, suspended, or otherwise dispersed therein, from 0.5 to 6 pounds of the dual agent having a particle size of from 10–100 mesh, as hereinbefore specified, per gallon of fracture fluid. These mixtures are used in a conventional manner, i.e., injection into a well bore under sufficient pressure to fracture the potentially productive zone. Such pressures will normally range from about 0.6 to 1.0 p.s.i. per foot of depth of the selected portion of the formation. When fracture occurs, the dual agents of the invention are forced into the cracks and fissures of the fracture so that as the pressure is reduced, these agents function to prop open the fracture.

As connate water, or injection water in the case of water flood fields, enters the fracture zone, cations present which would react with sulfate or carbonate anions to form insoluble materials such as calcium sulfate (gypsum), calcium carbonate, magnesium carbonate and barium carbonates and sulfates, are scavenged by the alkali metal sulfonate groups (or other ion-scavenging groups), exchanging the alkali metal ions of the alkali metal sulfonates for the "hard" ions.

The water containing calcium, magnesium and/or barium ions will vary in concentration periodically, and similarly, brine (NaCl) is produced either continually or periodically by many wells. Regeneration of "spent" sites on the scavenging agent is effected by such brine. Some regeneration may occur from periodic brine production but if insufficient regeneration occurs spontaneously, regeneration of the resin can be effected by injecting a strong brine solution into the well. Suitable brine regenerating solutions will generally contain from 6 to 20 weight percent NaCl. Contacting of a "spent" dual agent of the invention with such brine solutions for from about 1 to 100, preferably 24 to 72, hours serves to exchange the sodium ions of the brine for the calcium or other alkaline earth metal ions on the sulfonate groups of the dual agent.

Any of the underground formations or strata known to be fracturable can be fractured using the novel fracturing liquid of the subject invention, such as consolidated sandstones, limestones, dolomites, granite washes, hard or brittle shale, conglomerates, and the like, such formations generally having a permeability in the range of 0.1 to 200 millidarcies. Formations having existing fractures, or initial fractures created by previous fracturing operations, can be extended and the productivity of the formation increased by using the fracturing fluid of this invention to extend such fractures.

The well treated with the fracturing liquids of this invention can be provided with the usual wellhead pressure connections and fittings, such as blow-out preventors, pressure gauges, etc. The hydraulic fracturing liquid of this invention can be pumped directly down the well casing or down through tubing depending within the casing. The particular formation to be fractured can be isolated by means of suitable packers or the like. The usual pump trucks can be used to pump the hydraulic fracturing liquid down through either the casing or tubing, or both. Prior to the actual fracturing operation, the well bore can be cleaned with any suitable cleaning liquid such as dilute acid, lease crude, any of the carriers used to prepare the fracturing liquid, or the fracturing liquid itself.

If desired, the initial fractures can be produced with lease crude, or any other suitable liquid such as those employed as carriers in the fracturing liquids of this invention, or even the fracturing liquid of the subject invention; these liquids can be generically termed "formation breakdown fluids." After fractures have been initiated, the fracturing liquid of this invention is then pumped into the initially-formed fractures under high pressure to extend the same. Where fracturing is to take place through a casing, the casing can be perforated by conventional means, such as with a perforating gun lowered into the well by means of a wire line to provide one or more perforations adjacent the formation to be fractured. Where the fracturing operation is carried out in open-hole, perforating operations are generally not necessary. The formation breakdown pressure will generally be less than or equal to the overburden pressure, therefore most formations will be fractured with pressures from about 0.6 to 1.0 p.s.i. per foot of depth of the selected portion of the formation, e.g., from 500 to 3500 p.s.i. When the formation breakdown pressure is reached, the formation of initial fractures will be indicated by a pressure drop at the surface. The hydraulic fracturing liquid of this invention, if not used to produce said initial fractures, can then be pumped into the well and into the initially-formed fractures, the suspended dual or combination propping and alkaline earth metal scavenging agent of the invention being deposited in the extended fractures.

At the end of the fracture treatment, pressure is released and fracturing liquid allowed to continually leak off into the formation until the walls of the fractures close down upon the deposited propping material which holds the fractures fully or partially open, thereby maintaining the increased permeability of the formation. The fracturing fluid can then be removed from the wall by producing the same. As a result of the fracture treatment, the flow or drainage pattern of the formation is enlarged and the productivity of the well is increased. The extension length or width of the fractures will depend upon the volume of fracturing fluid injected, the volume of fracturing fluid retained in the fractures, and the geometry of the fracture. Such fractures will be oriented in horizontal planes, vertical planes or slightly inclined planes, depending upon the viscosity of the fracturing fluid and the formation stresses and tensile strength of the formation. The formation can be successively fractured by additional fracture treatments in the same or different selected portions of the well.

The fracturing liquids of this invention can be prepared by employing any of the conventional proportioning and mixing techniques now used in the art. For example, the dual agent of the invention can be added to the carrier or vehicle liquid as a dry material through a proportioner hopper.

The fracturing liquids of this invention can contain other agents or additives, in addition to the dual agents of the invention, which are commonly used for adjusting and/or controlling the physical properties of such liquids when it is desirable to do so. Examples of such other additives or agents include known fluid-loss control agents, known gelling agents, etc. The only requirement is that said other agents or additives be compatible with the dual agents of the invention. This can be determined by simple routine tests. One of the advantages of the dual agents of this invention is that they are less dense than conventional propping agents and therefore exhibit less tendency to settle out of the fracturing liquid.

The following example is set forth to further illustrate objects and advantages of this invention; however, it should be understood that the various ingredients, amounts of ingredients, and other conditions should not be construed so as to unduly limit this invention.

*Example*

A development well, drilled, cased, and perforated into a producing formation at 3000 feet, is fractured according to the method of this invention in the following manner.

A 35° API gravity lease crude oil having a viscosity of 15 centipoises at 80° F. is employed as the carrier or vehicle liquid. A 90/10 styrene/divinylbenzene cross-linked copolymer is prepared in conventional manner by emulsion polymerization at 25° C. employing a persulfate initiator. This polymer in bead form is then sulfonated at 25° C. with fuming sulfuric acid, followed by neutralization with NaOH. The resulting finely-divided polymer having a particle size in the range of 15 to 30 mesh, a high crushing strength, and sodium sulfonate groups on the surface, is admixed with the above-described carrier or vehicle liquid in a blend tank to form a slurry containing 2 pounds of sulfonated polymer per gallon of lease crude. The resulting fracturing fluid in the amount of 3000 gallons is then pumped down the tubing string, into the annulus, and through the casing perforations into the adjacent formation. At a pressure of 2400 p.s.i., formation breakdown or fracture is obtained. The well is then shut in for 8 hours, after which production is begun. The dual agent particles not retained in the fractures are recovered by screening the oil produced for the first week.

No plugging of the fractures by deposits therein, as determined by decline in produced fluids, is shown for the first 10 months, while wells in the same formation on adjacent leases which are not fractured by this method show a rapid decline in 3 to 4 months.

After 10 months, chemical analysis of the water present in the well production fluids shows the concentration of calcium ion therein is increasing, thus indicating that regeneration of the dual agent is needed. Regeneration of said dual agent is effected by injecting 3000 gallons of 10 percent by weight aqueous NaCl solution into the well and shutting in the well for 3 days, allowing the brine solution to remain in contact with the partially spent agent. After 3 days, the well valves are opened and production is resumed. The production for the first week is passed to a settler to separate the produced oil from the brine, with most of the brine being produced in the first few hours. Chemical analysis of the water contained in the well production fluids after production for one week shows a decrease in calcium ion concentration to a level comparable to the concentration level thereof following initial treatment of the well, and the oil production rate continues to remain at a high level.

Divinylbenzene, the presently most preferred crosslinking agent for use in the practice of the invention, is available commercially as a mixture of 1,2-; 1,3-; and 1,4-divinylbenzenes, which mixture can be used in the preparation of the dual agents of the invention. Thus, it will be understod that 1,3-divinylbenzene, while not specifically named above, is included as an example of a monomer represented by the above Formula I.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. A method of fracturing a formation penetrated by a well bore, which method comprises introducing into said well bore under sufficient pressure to fracture said formation a fracturing liquid composition having suspended therein finely divided crush-resistant particles of a combination propping and alkaline earth metal ion scavenging agent which can be regenerated in place in said formation.

2. A method of treating a formation penetrated by a well bore, which method comprises introducing into said well bore a formation breakdown fluid under sufficient pressure to fracture said formation, and injecting into the fractured formation a composition comprising a liquid carrier containing finely divided crush-resistant particles of a combination propping and alkaline earth metal ion scavenging agent which can be regenerated in place in said formation.

3. A method of fracturing a formation penetrated by a well bore, which method comprises: introducing into said well bore under sufficient pressure to fracture said formation a fracturing liquid having suspended therein, in an amount sufficient to effectively support and maintain open the resulting fractures in said formation when said liquid is removed, finely divided crush-resistant particles of a dual propping and alkaline earth metal ion scavenging agent which can be regenerated in place in said formation; maintaining said pressure for a predetermined period of time; and releasing said pressure.

4. A method according to claim 3 wherein said agent comprises an alkali metal salt of a sulfonated copolymer of a monovinyl-substituted aromatic hydrocarbon with a divinyl-substituted aromatic hydrocarbon comonomer wherein said comonomer is incorporated in said copolymer in an amount of up to 20 weight percent of said copolymer.

5. A method according to claim 4 wherein said agent comprises the sodium salt of a sulfonated copolymer of styrene and divinylbenzene wherein said divinylbenzene is incorporated in said copolymer in an amount within the range of from 2 to 15 weight percent of said copolymer.

6. A method of fracturing a formation penetrated by a well bore, which method comprises: introducing into said well bore under sufficient pressure to fracture said formation a fracturing liquid having suspended therein, in an amount of from 0.5 to 6 pounds per gallon of said liquid, finely divided particles of a dual propping and alkaline earth metal ion scavenging agent comprising an alkali metal salt of a sulfonated polymer of a monovinyl-substituted aromatic hydrocarbon; maintaining said pressure for a predetermined period of time; and releasing said pressure.

7. A method of fracturing a formation penetrated by a well bore, which method comprises: introducing into said well bore under sufficient pressure to fracture said formation a fracturing liquid having suspended therein, in an amount of from 0.5 to 6 pounds per gallon of said liquid, finely divided particles of a combination propping and alkaline earth metal ion scavenging agent comprising an alkali metal salt of a sulfonated polymer of a monovinyl-substituted aromatic hydrocarbon having a nucleus selected from the group consisting of benzene and naphthalene nuclei; maintaining said pressure for a predetermined period of time; and releasing said pressure.

8. A method of fracturing a formation penetrated by a well bore, which method comprises: introducing into said well bore under sufficient pressure to fracture said formation a fracturing liquid comprising a liquid carrier medium having suspended therein, in an amount of from 0.5 to 6 pounds per gallon of said liquid carrier medium, finely divided particles of a dual propping and alkaline earth metal ion scavenging agent comprising a polymer material selected from the group consisting of (a) an alkali metal salt of a sulfonated homopolymer of a monovinyl-substituted aromatic hydrocarbon monomer having a nucleus selected from the group consisting of benzene and naphthalene nuclei, and (b) an alkali metal salt of a sulfonated copolymer of a said monomer with a divinyl-substituted aromatic hydrocarbon comonomer having a nucleus selected from the group consisting of benzene and naphthalene nuclei, said comonomer being incorporated in said copolymer in an amount of up to 20 weight percent of said copolymer; maintaining said pressure for a predetermined period of time; releasing said pressure; and thereafter producing said well to remove said liquid carrier medium, whereby said dual propping and scavenging agent is left in said fractures.

9. The method of claim 8 wherein said dual agent comprises the sodium salt of a sulfonated copolymer of styrene and divinylbenzene wherein said divinylbenzene is incorporated in said copolymer in an amount within the range of from 2 to 15 weight percent of said copolymer.

10. A method of fracturing a formation penetrated by a well bore, which method comprises: introducing into said well bore under sufficient pressure to fracture said formation a fracturing liquid composition comprising a liquid carrier medium having suspended therein, in an amount sufficient to effectively support and maintain open the resulting fractures in said formation after said composition has been used to fracture said formation and the liquid of said composition removed from said fractures, finely divided particles of a dual propping and alkaline earth metal ion scavenging agent comprising a finely divided inert solid carrier material having a coating thereon consisting essentially of a polymer material selected from the group consisting of (a) an alkali metal salt of a sulfonated homopolymer of a monovinyl-substituted aromatic hydrocarbon monomer having a nucleus selected from the group consisting of benzene and naphthalene nuclei, and (b) an alkali metal salt of a sulfonated copolymer of a said monomer with a divinyl-substituted aromatic hydrocarbon comonomer having a nucleus selected from the group consisting of benzene and naphthalene nuclei, said comonomer being incorporated in said copolymer in an amount of up to 20 weight percent of said copolymer; maintaining said pressure for a predetermined period of time; releasing said pressure; and thereafter producing said well to remove said liquid, whereby said dual propping and scavenging agent is left in said fractures.

11. The method of claim 10 wherein said polymer material comprises the sodium salt of a sulfonated copolymer of styrene and divinylbenzene wherein said divinylbenzene is incorporated in said copolymer in an amount within the range of from 2 to 15 weight percent of said copolymer.

12. A method of treating a formation penetrated by a well bore, which method comprises: introducing into said well bore under sufficient pressure to fracture said formation a fracturing liquid having suspended therein, in an amount sufficient to effectively support and maintain open the resulting fractures in said formation when said liquid is removed therefrom, finely divided particles of a dual propping and alkaline earth metal ion scavenging agent comprising an alkali metal salt of a sulfonated polymer of a monovinyl-substituted aromatic hydrocarbon; maintaining said pressure for a predetermined period of time; releasing said pressure; thereafter producing fluids from said well to remove said liquid from said fractures, whereby said dual propping and scavenging agent is left in said fractures; continuing production of said well for a period of time sufficient to partially spend the alkaline earth metal ion scavenging capacity of said dual agent; discontinuing said production of said well; introducing an aqueous solution of an alkali metal chloride into said well and into said fractures in contact with said partially spent dual agent; maintaining said alkali metal chloride solution in contact with said partially spent dual agent for a period of time sufficient to substantially regenerate same; and thereafter resuming production of said well.

13. A composition of matter, useful in the fracture treatment of a formation penetrated by a well bore, comprising a liquid carrier medium having suspended therein finely divided crush-resistant particles of a combination propping and alkaline earth metal ion scavenging agent comprising an alkali metal salt of a sulfonated copolymer of a monovinyl-substituted aromatic hydrocarbon with a divinyl-substituted aromatic hydrocarbon comonomer wherein said comonomer is incorporated in said copolymer in an amount of up to 20 weight percent of said copolymer.

14. A composition of matter, useful in the fracture treatment of a formation penetrated by a well bore, comprising a liquid carrier medium having suspended therein finely divided crush-resistant particles of a dual propping and alkaline earth metal ion scavenging agent comprising an alkali metal salt of a sulfonated copolymer of a monovinyl-substituted aromatic hydrocarbon with a divinyl-substituted aromatic hydrocarbon comonomer wherein said comonomer is incorporated in said copolymer in an amount of up to 20 weight percent of said copolymer, said duel agent being present in an amount sufficient to effectively support and maintain open the resulting fractures after said composition has been used to fracture said formation and said liquid carrier medium of said composition has been removed from said fractures.

15. A well fracturing composition comprising a liquid carrier medium having suspended therein, in an amount of from 0.5 to 6 pounds per gallon, a combination propping ion scavenging agent comprising finely divided, crush-resistant particles having alkaline earth metal ion scavenging groups available at the surface thereof, said particles comprising an alkali metal salt of a sulfonated copolymer of a monovinyl-substituted aromatic hydrocarbon with a divinyl-substituted aromatic hydrocarbon comonomer wherein said comonomer is incorporated in said copolymer in an amount of up to 20 weight percent of said copolymer.

16. A well fracturing composition comprising a liquid carrier medium having suspended therein, as a dual propping and alkaline earth metal ion scavenging agent, from 0.5 to 6 pounds per gallon of said liquid of finely divided crush-resistant particles comprising the sodium salt of a sulfonated copolymer of a monovinyl-substituted aromatic hydrocarbon with a divinyl-substituted aromatic hydrocarbon comonomer wherein said comonomer is incorporated in said copolymer in an amount within the range of from 2 to 15 weight percent of said copolymer.

17. A composition of matter, useful in the fracture treatment of a formation penetrated by a well bore, comprising a liquid carrier medium having suspended therein, as a combination propping and alkaline earth metal ion scavenging agent, from 0.5 to 6 pounds per gallon of said carrier medium of finely divided crush-resistant particles comprising an alkali metal salt of a sulfonated copolymer of a monovinyl-substituted aromatic hydrocarbon monomer having a nucleus selected from the group consisting of benzene and naphthalene nuclei with a divinyl-substituted aromatic hydrocarbon comonomer having a nucleus selected from the group consisting of benzene and naphthalene nuclei, said comonomer being incorporated in said copolymer in an amount of up to 20 weight percent of said copolymer.

18. A composition of matter according to claim 17 wherein said combination agent comprises the sodium salt of a sulfonated copolymer of styrene and divinylbenzene wherein said divinylbenzene is incorporated in said copolymer in an amount within the range of from 2 to 15 weight percent of said copolymer.

19. A composition of matter, useful in the fracture treatment of a formation penetrated by a well bore, comprising a liquid carrier medium having suspended therein finely divided particles of a combination propping and alkaline earth metal ion scavenging agent, said combination agent being present in an amount sufficient to effectively support and maintain open the resulting fractures after said composition has been used to fracture said formation and the liquid of said composition removed from said fractures, and said particles comprising a finely divided inert solid carrier material having a coating thereon consisting essentially of a polymer material selected from the group consisting of (a) an alkali metal salt of a sulfonated homopolymer of a monovinyl-substituted aromatic hydrocarbon monomer having a nucleus selected from the group consisting of benzene and naphthalene nuclei, and (b) an alkali metal salt of a sulfonated copolymer of a said monomer with a divinyl-substituted aromatic hydrocarbon comonomer having a nucleus selected from the group consisting of benzene and naphthalene nuclei, said comonomer being incorporated in said copolymer in an amount of up to 20 weight percent of said copolymer.

20. A composition of matter according to claim 19 wherein said polymer material comprises the sodium salt of a sulfonated copolymer of styrene and divinylbenzene wherein said divinylbenzene is incorporated in said copolymer in an amount within the range of from 2 to 15 weight percent of said copolymer.

References Cited by the Examiner

UNITED STATES PATENTS

| | | | |
|---|---|---|---|
| 2,612,485 | 9/1952 | Baer et al. | 252—8.5 |
| 2,650,905 | 9/1953 | Fordyce et al. | 252—8.5 |
| 3,021,901 | 2/1962 | Earlougher | 166—42.1 |
| 3,072,192 | 1/1963 | Van Poollen | 166—42.1 |
| 3,125,518 | 3/1964 | Knox | 166—42.1 |
| 3,194,314 | 7/1965 | Van Poollen | 166—42.1 |

CHARLES E. O'CONNELL, *Primary Examiner.*

S. J. NOVOSAD, *Assistant Examiner.*